Feb. 12, 1957  E. J. FREY  2,781,061
FLOW CONTROLLER

Filed Jan. 8, 1954  2 Sheets-Sheet 1

INVENTOR.
Edward J. Frey
BY
His Attorney

Feb. 12, 1957 E. J. FREY 2,781,061
FLOW CONTROLLER
Filed Jan. 8, 1954 2 Sheets-Sheet 2

INVENTOR.
Edward J. Frey
BY
His Attorney

United States Patent Office 2,781,061
Patented Feb. 12, 1957

2,781,061
FLOW CONTROLLER

Edward J. Frey, Dayton, Ohio, assignor to General Motors Corporation, Detroit, Mich., a corporation of Delaware Application January 8, 1954, Serial No. 402,945

6 Claims. (Cl. 138—46)

This invention relates to controllers for fluids, such as water for washing machines or the like.

An object of this invention is to provide a controller discharging fluid at a substantially constant rate from a supply under varying head pressure.

Another object of this invention is to provide a controller, of the foregoing character, which is capable of being made by simple operations such as boring, broaching and/or casting.

Another object of this invention is to provide a controller which may be placed in the water supply line of an automatic washing machine by simple threaded connections between the thermostatic valve and the discharge nozzle without any abrupt turns or other fluid flow restrictions.

Further objects and advantages of the present invention will be apparent from the following description, reference being had to the accompanying drawings wherein a preferred embodiment of the present invention is clearly shown.

Figure 1:
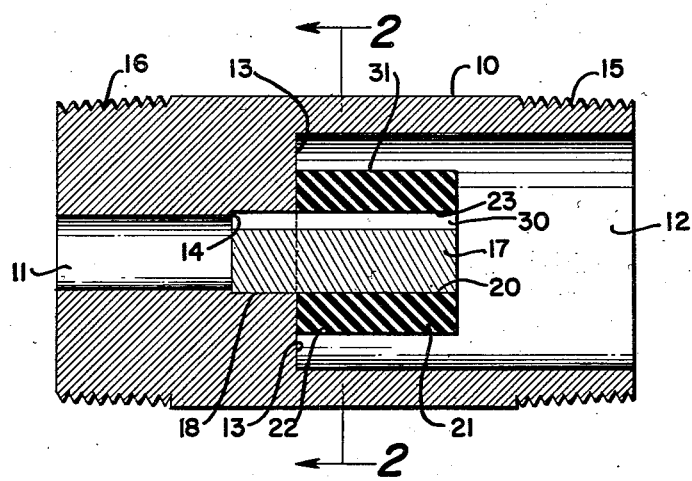
Figure 1 is a vertical longitudinal cross-section taken along the line 1—1 of Figure 2.

A water controller embodying my invention may include an outer solid casing 10 having an inner fluid flow channel including an outlet portion 11, an inlet portion 12, and an intermediate wall portion 13. The inlet and outlet portions 12 and 11 may be made by boring operations which terminate to produce the intermediate wall portion 13. In addition, if desired, a small shoulder 14 may be added to the outlet portion 11, by additionally boring the larger diameter portion 18.

The outer casing 10 may be threaded at 15 and 16 so that it may be connected in the fluid supply line leading from the usual solenoid controller to the washing machine.

An inner solid member 17 is supported adjacent the intermediate wall portion 13 by being press-fitted into the larger diameter portion 18 of the outlet portion 11. The press-fit inserts the member 17 against the shoulder 14. The solid member 17 has an outer tubularly shaped surface 20 extending partly in the outlet portion 11 and partly in the inlet portion 12.

An outer flexible tube member 21 is placed around the solid member 17 with an end 22 against the intermediate wall portion 13. The flexible tube member 21 has an inner surface 23 in contact with the tubularly shaped surface 21 of the solid member 17.

One of the surfaces 20 or 23, such as the surface 20, has longitudinally directed grooves 30 extending between the inlet and outlet portions 12 and 11 to permit a high velocity fluid flow through such grooves 30 and a static fluid head pressure on the outer surface 31 of the flexible tube member 21. The grooves 30 may be formed by a broaching operation.

The controller is useful in supplying water for a washing machine, as disclosed in my copending and simultaneously filed application for domestic appliances, Serial No. 402,944, filed January 8, 1954.

Figure 2:
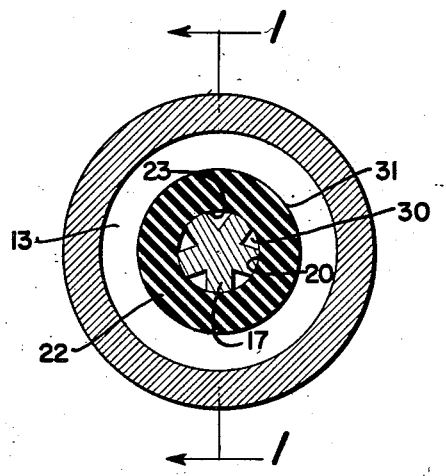
Figure 2 is a transverse cross-section taken along the line 2—2 of Figure 1.

In the operation of the controller shown in Figures 1 and 2, fluid or water under pressure enters the inlet portion 12 under varying head pressure and flows at high velocity through the grooves 30 into the outlet portion 11 and from thence to the washing machine. Water having static fluid head pressure surrounds the outer surface 31 of the flexible member. It exerts a radially inward pressure against the flexible member and flexes it slightly into the grooves 30. There is a pressure difference between the pressure on surface 31, surrounding the flexible member 21, and the pressure of the fluid flowing through the grooves 30, due to the kinetic high velocity pressure in the grooves 30. This pressure difference increases and decreases as the head pressure of the fluid entering 12 increases or decreases. This variation in the pressures at 31 and 30 tends to flex the tube 13 in varying degrees to compensate for varying head pressures and irons out any slight variations in flow at the outlet 11. The flow at 11 is substantially constant, or the variations in the flow at 11 are so minute that the water entering the washing machine may be measured by a time controller without the use of a float control.

The size of the grooves 30 and the thickness and flexibility of the tube 13 may be calibrated to produce the desired rate of flow at outlet 11.

Figure 3:
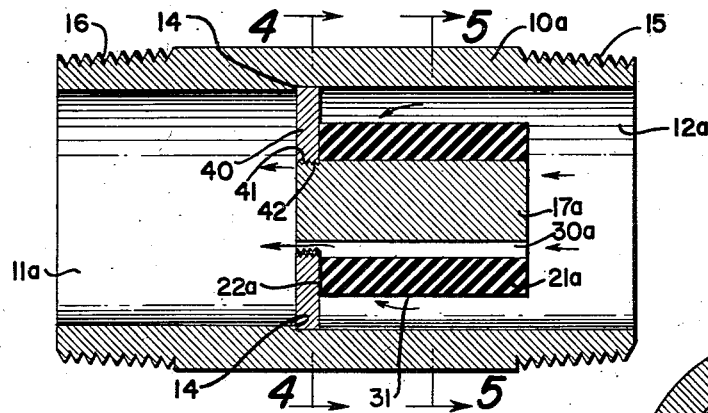
Figure 3 is a view similar to Figure 1, showing a modified form, and taken along the line 3—3 of Figure 4.
Figure 4:
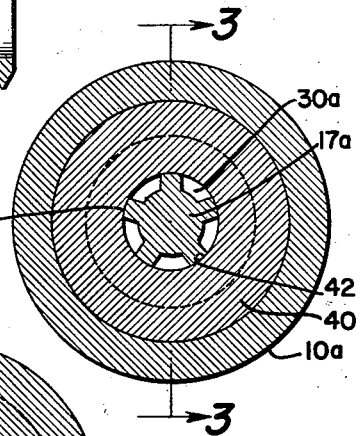
Figure 4 is a view taken on the line 4—4 of Figure 3.
Figure 5:
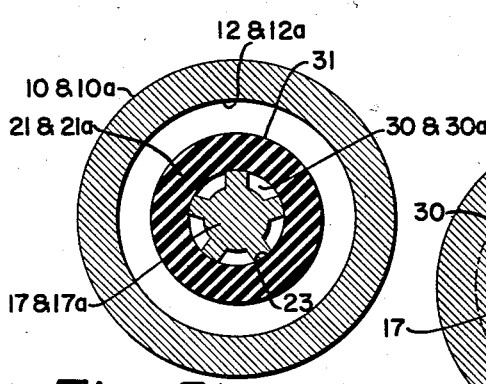
Figure 5 is a view taken on the lines 5—5 of Figures 3 and 6.

In the modification shown in Figures 3, 4 and 5, the outer casing 10a has outlet portion 11a, inlet portion 12a and an intermediate portion including shoulder 13a and disc 40 which is press fitted into inlet 12a and against shoulder 13a. The disc 40 has a circular threaded opening 41. The inner solid member 17a has a circular threaded end 42 which fits into the threaded opening 41. Grooves 30a are made longitudinally in solid member 17a, and extend through the threaded end 42. The outer flexible tube member 21a is placed around solid member 17a with an end 22a against the disc 40. The parts in Figures 3, 4 and 5 which have been numbered with the same numbers as in Figures 1 and 2, but with the suffix "a," operate substantially the same as in Figure 1, as will be apparent.

Figure 7:
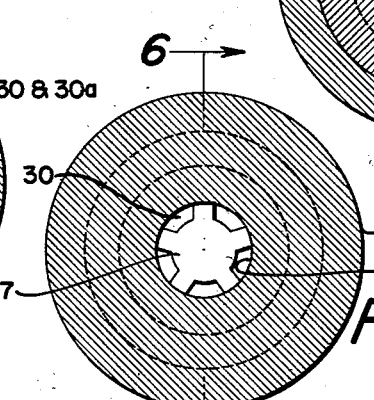
Fig. 7 is a view taken on line 7—7 of Fig. 6.
Figure 6:
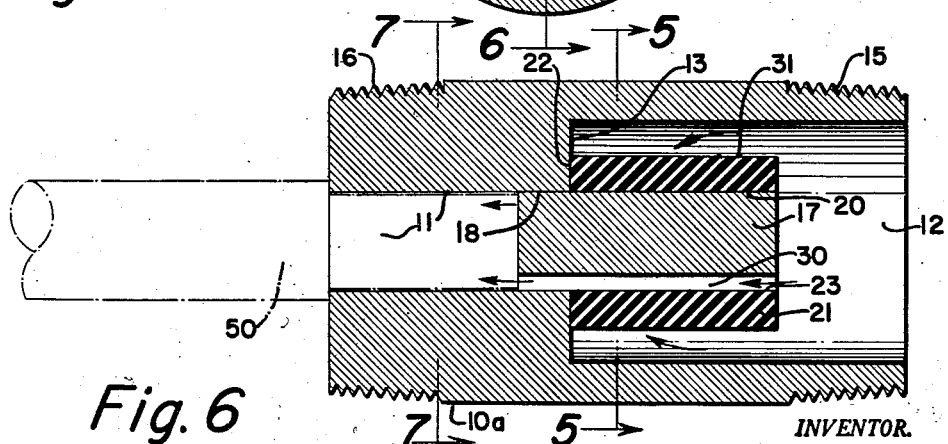
Figure 6 is a view similar to Figure 1 showing a slightly modified form and indicating a step in the manufacture of the controller.

The modification shown in Figures 6 and 7 is substantially the same as in Figures 1, 2 and 3 except that the small shoulder 14 has been omitted. Instead, the solid member 17 of Figures 6 and 7 is press fitted into outlet 11 with its limit being determined either by the shouldered tool 50 or by the limit of travel of the press. Otherwise all of the parts operate substantially the same as in Figures 1 and 2.

While the form of embodiment of the invention as herein disclosed constitutes a preferred form, it is to be understood that other forms might be adopted as may come within the scope of the claims which follow.

What is claimed is as follows:

1. A controller for fluid under varying head pressures comprising: an outer casing having an inner fluid flow channel including a cylindrical outlet portion of uniform cross-section for a substantial length, a cylindrical inlet portion of larger cross-section and of uniform cross-section for a substantial length, and an intermediate wall portion between said inlet and outlet portions; an inner solid cylindrical member of uniform diameter substantially the same as the diameter of said outlet portion extending through said intermediate wall portion and being partly in and supported by said outlet portion and having a portion cantilevered in said inlet portion, said inner solid cylindrical member having one or more longitudinal grooves of uniform cross-section throughout their length and extending partly in said outlet portion and partly in said cantilevered portion; said grooves connecting said inlet and outlet portions, and an outer flexible tube member in said inlet portion around said cantilevered portion with an end against said intermediate wall portion, said outer flexible tube member being radially spaced from said casing said flexible member having an inner cylindrical surface of uniform cross-section throughout its effective controller length and having an internal diameter substantially the same as the diameter of said inner solid cylindrical member.

2. A controller having an inlet side and an outlet side and adapted to be connected in a fluid line for maintaining a substantially constant rate of flow in said line irrespective of varying head pressure comprising, an outer flexible tube member on said inlet side having an inner surface and being of uniform cross-section along its effective fluid controlling length, an inner solid member with an outer tubular shaped surface having longitudinally directed grooves and being of uniform cross-section along its effective fluid controlling length, said grooves extending along the effective fluid controlling length of said solid member and connecting said inlet and outlet sides of said controller, said outer surface being in contact with said inner surface between said grooves, and means radially spaced from said outer flexible tube member defining a pressure space therewith, said pressure space being adapted to contain inlet static fluid head pressure for variably constricting said grooves, whereby the flow of fluid from said inlet side to said outlet side through said grooves is controlled.

3. A controller having an inlet side and an outlet side and adapted to be connected in a fluid line for maintaining a substantially constant rate of flow in said line irrespective of varying head pressure comprising, an outer flexible tube member on said inlet side having an inner surface and being of uniform cross-section along its effective fluid controlling length, an inner solid member with an outer tubular shaped surface having a uniform cross-section along its effective fluid controlling length, one of said members having longitudinally directed grooves along its effective fluid controlling length connecting said inlet and outlet sides, and the other of said members having its surface in engagement with the surface between said grooves and along the effective fluid controlling length of said grooves, and means radially spaced from said outer flexible tube member defining a pressure space therewith, said pressure space being adapted to contain static inlet fluid head pressure for variably constricting said grooves, whereby the flow of fluid from said inlet side to said outlet side through said grooves is controlled.

4. A controller for fluid under varying head pressure comprising, an outer casing having an inner fluid flow channel; an outer flexible tube member in said casing having an inner surface and being of uniform cross-section along its effective fluid controlling length; and an inner solid member of uniform cross-section along its effective fluid controlling length having an outer tubular shaped surface formed with longitudinally directed grooves along its effective fluid controlling length, said outer surface being in contact with said inner surface between said grooves and along said effective fluid controlling length; said members extending axially of said casing; said outer flexible tube member being radially spaced from said casing and forming an annular pressure space therewith; said pressure space being adapted to contain static inlet fluid head pressure for variably constricting said grooves whereby fluid flow through said grooves is controlled.

5. A controller for fluid under varying head pressure comprising: an outer casing having an inner fluid flow channel including an outlet portion, an inlet portion of larger cross-section and an intermediate wall between said inlet and outlet portions; an inner solid member supported by and extending through said wall portion and having an outer tubular shaped surface; said inner solid member being of uniform cross-section along its effective fluid controlling length and having longitudinally directed grooves along its effective fluid controlling length that connect said inlet and outlet portions; and an outer flexible tube member around said solid member with an end against said intermediate wall portion and radially spaced from said outer casing, said flexible tube member being of uniform cross-section along its effective fluid controlling length and having an inner surface in contact with the tubular shaped surface of said solid member between said grooves and along said effective fluid controlling length.

6. A controller for fluid under varying head pressure comprising: an outer casing forming an inner fluid flow channel and having an inlet and an outlet; an outer flexible tube member in said inlet having an inner cylindrical surface in said casing; said outer flexible tube member being radially spaced from said casing; an inner solid member with an outer cylindrically shaped surface and with uniform longitudinally directed grooves extending along the entire length of said flexible tube member, said outer surface being in contact with said flexible tube member throughout its length between said grooves; and a transverse wall in said inner fluid flow channel supporting said solid member and cooperating with said solid member to form fluid flow openings in alignment with said longitudinally directed grooves and connecting with said outlet.

References Cited in the file of this patent
UNITED STATES PATENTS 2,554,790    Miller ------------------ May 29, 1951
2,573,712    Kallam ----------------- Nov. 6, 1951